Patented Sept. 20, 1932

1,877,900

UNITED STATES PATENT OFFICE

ERICH KRONHOLZ, OF BAD SODEN-ON-THE-TAUNUS, AND HANS SCHLICHENMAIER, OF KELKHEIM IN TAUNUS, GERMANY, ASSIGNORS TO GENERAL ANILINE WORKS, INC., OF NEW YORK, N. Y., A CORPORATION OF DELAWARE

NEW ACID DYESTUFFS AND A PROCESS OF PREPARING THEM

No Drawing. Application filed March 12, 1931, Serial No. 522,174, and in Germany March 20, 1930.

The present invention relates to new acid dyestuffs and a process of preparing them.

We have found that new valuable blue acid dyestuffs are obtainable by causing a compound of the following general formula:

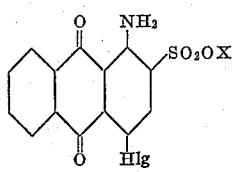

wherein X stands for hydrogen or a metal residue and

Hlg stands for chlorine or bromine to react with a compound of the following general formula:

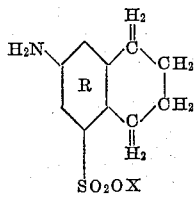

wherein X stands for hydrogen or a metal residue and the nucleus R may contain further substituents. The dyestuffs thus obtained are distinguished by their especially clear tints and excellent fastness properties.

The following example serves to illustrate the invention but it is not intended to limit it thereto, the parts being by weight:

A mixture of 40 parts of 1-amino-4-bromo-anthraquinone-2-sodium sulfonate, 34 parts of the sodium salt of 2-amino-5.6.7.8-tetra-hydronaphthalene-4-sulfonic acid (obtainable from tetra-hydronaphthalene by sulfonating and subsequently nitrating and reducing) and 300 parts of water, is heated to boiling in a reflux apparatus for about 4 hours, while adding 16 parts of anhydrous sodium carbonate and 1 part of a copper salt, for instance, cuprous chloride or powdered copper. There is obtained a blue solution from which, after cooling, the dyestuff is precipitated in the usual manner by addition of sodium chloride. The dyestuff which has the following formula:

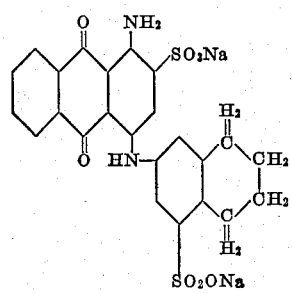

is purified by dissolving it in hot water, filtering and reprecipitating by addition of hydrochloric acid. When dry, it is a dark blue powder and dyes wool from an acid bath a greenish tint of excellent fastness properties.

We claim:

1. The process which comprises condensing a compound of the following formula:

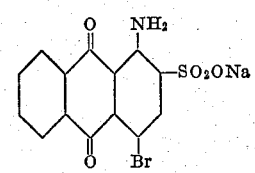

with a compound of the following formula:

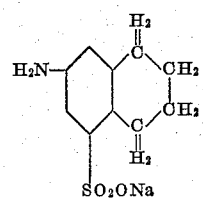

by heating the components in the presence of water, sodium carbonate and a small quantity of cuprous chloride.

2. As a new product, the compound of the following formula:
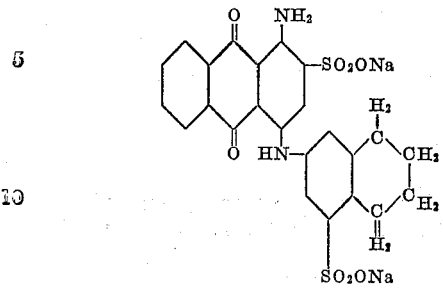
forming in the dry state a dark blue powder, dyeing wool from an acid bath a greenish blue tint of excellent fastness properties.
In testimony whereof, we affix our signatures.
ERICH KRONHOLZ.
HANS SCHLICHENMAIER.